Sept. 6, 1927.

W. F. HALL

SPROCKET CHAIN AND LINK THEREFOR

Filed June 10, 1926

1,641,536

WITNESS
O. W. Holmes

INVENTOR.
WESLEY F. HALL
BY Knight Bro
ATTORNEYS.

Patented Sept. 6, 1927.

1,641,536

UNITED STATES PATENT OFFICE.

WESLEY F. HALL, OF MATAWAN, NEW JERSEY, ASSIGNOR TO THE HANSON & VAN WINKLE COMPANY, OF NEWARK, NEW JERSEY, A CORPORATION OF NEW JERSEY.

SPROCKET CHAIN AND LINK THEREFOR.

Application filed June 10, 1926. Serial No. 115,009.

This invention relates to sprocket chains designed to have freedom of motion in two planes.

The object of the invention is to produce a chain of such double-jointed character from sheet metal by simple blanking and bending operations that will have but one piece to each link and yet have true journal interlinkages between the links.

In carrying out the invention, I cut out from a sheet of metal by a suitable cutting die, a flat blank characterized by eyeleted ends and rectangular center wings. I then bend the blank in the middle to a U-shape and form the wing extensions into tubular extensions adapted to fit as journals in the eyelets of an adjacent link. These tubular journal extensions, by being made sufficiently long, serve to form also journals for rollers and the ends of the tubular journals are expanded to form flanges to retain the rollers.

For special links requiring lugs for the attachment of devices for carrying or propelling articles, the blank is made with side ears which may be bent or shaped to fit any desired surface.

In the accompanying drawings.

Figure 1:
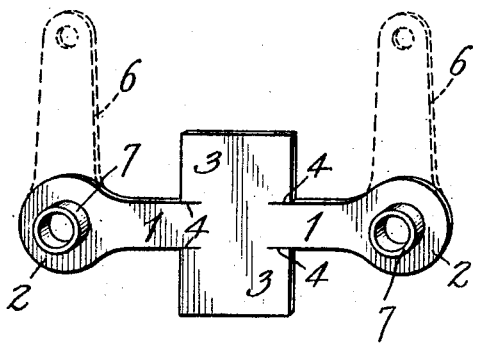
Figure 1 is a perspective view of the blank in the flat.
Figure 2:
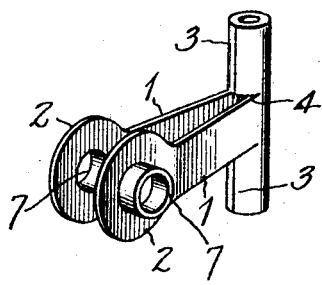
Figure 2 is a perspective view of the link bent into final shape.

In manufacturing the chain, a blank such as shown in Figure 1 is cut, stamped or punched out of flat sheet metal. The blank has a central longitudinal portion 1 with eyeleted ends 2 and central transverse wings 3. The wings 3 are preferably partially divided from the central portion 1 by slits 4, and the eyes of the ends 2 are formed by punching and extruding the metal to form collars 7.

Figure 3:
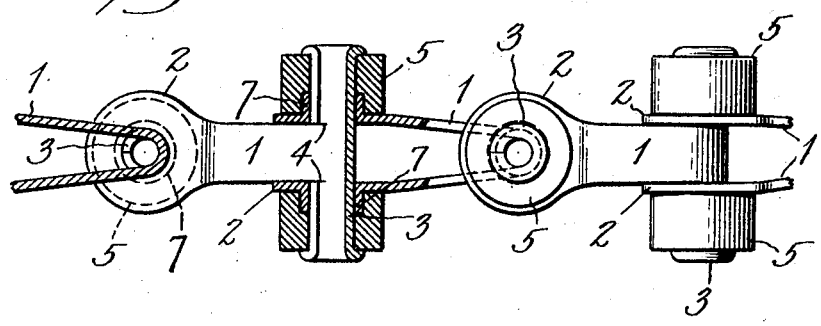
Figure 3 is a side view of a number of links coupled together and having rollers mounted thereon.
Figure 4:
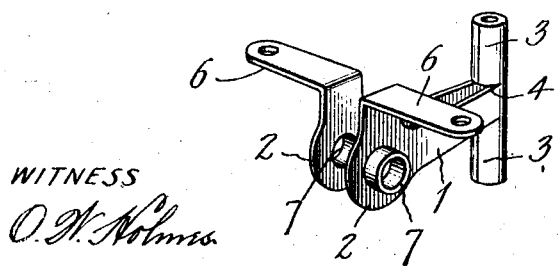
Figure 4 is a perspective view of a link with special ears attached.

In the second stage of the method, the blank is bent or folded on itself into the shape of a U with the eyeleted ends 2 brought opposite each other, the space between these end portions being equal to the width of the central stem 1. During this folding operation or before it or after it, the side wings 3 are bent into tubular shape with a diameter equal to the diameter of the fold of the link so as to form journal-like extensions on each side of said fold. These tubular extensions are adapted to fit journal-like into the eyeleted ends 2 and may be expanded at their outer ends to hold the said ends from spreading. By making the tubular extensions long enough, they may not only hinge the links together, but may form outboard bearings for rollers 5 such as are in common use with sprocket chains. In case rollers are used, the ends of the tubular portions are expanded after the rollers are placed on them so as to retain the rollers in place. When, as is preferably the case the collars 7 are formed by extruding the metal in forming the eyes in the ends 2, the rollers should be counterbored to receive the collars which therefore form extended bearings or hubs. As shown in Figure 3, rollers may be placed at every link in which case the chain is adapted to be roller-guided in two planes, i. e. it may travel in a vertical curve and then change to a horizontal curve. It is evident, however, that the rollers may be attached only to alternate links when roller-guiding in one plane only is sufficient. As it is often desired to have certain links of a sprocket chain provided with means for attaching special conveying apparatus, I have shown at 6 in Figure 4 how ear extensions formed with the blank on the eyeleted ends 2 as shown by dotted lines in Figure 1, may be bent or shaped to provide lugs for this purpose.

It will be seen from the above description that the chain, although made of sheet stock, has not only the minimum number of parts, but has ample bearing surfaces substantial enough to withstand considerable wear and tear. The chain is also of a character easily fabricated by machinery.

I claim:—

1. Method of making a sprocket chain link, comprising cutting a blank from flat stock with eyeleted ends and winged extensions at the center, folding the blank at the center to form a link with the eyeleted ends opposite and forming the winged extensions into tubular side journals.

2. Method of making sprocket chains comprising cutting blanks from flat stock with eyeleted ends and winged extensions at the center, folding the blanks at the center to form links with the eyeleted ends opposite, forming the winged extensions into tubular side journals, and inserting the said journals in the eyeleted ends of an adjacent link.

3. Method of making sprocket chains comprising cutting blanks from flat stock with eyeleted ends and winged extensions at the center, folding the blanks at the center to form links with the eyeleted ends opposite, forming the winged extensions into tubular side journals, inserting the said journals in the eyeleted ends of an adjacent link and expanding the ends of the tubular extensions to lock the links together.

4. Method of making sprocket chains comprising cutting blanks from flat stock with eyeleted ends and winged extensions at the center, folding the blanks at the center to form links with the eyeleted ends opposite, forming the winged extensions into tubular side journals, inserting the said journals in the eyeleted ends of an adjacent link, placing rollers on the extensions, and expanding the ends of the tubular extensions to lock the links together.

5. A sprocket chain link formed of flat stock characterized by a central portion forming two legs of a U, each leg having eye holes in the end, the metal at the bend of the U extending outward laterally in the plane of the flat sides of the U and at right angles to the center line of the eye holes to form journals adapted to work in the eye holes of an identical link to form a universal sprocket chain.

6. A sprocket chain made of links formed from flat stock bent flat-wise into U-form, with eye holes in the ends and central winged portions, the latter formed into tubular journals at right angles with the center line of the eye holes, the said journal portions extending through the eye holes of the adjacent link, rollers mounted on the extensions and the extensions expanded outside the rollers to retain the same.

WESLEY F. HALL.